US006764702B1

(12) United States Patent
Tõrngren et al.

(10) Patent No.: US 6,764,702 B1
(45) Date of Patent: Jul. 20, 2004

(54) THAWING METHOD IN MICROWAVE OVEN

(75) Inventors: Per Åke Tõrngren, Norrleõping (SE); Birgitta Jna Kidblad, Norrkõping (SE)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 09/889,191

(22) PCT Filed: Dec. 23, 1999

(86) PCT No.: PCT/EP99/10352

§ 371 (c)(1), (2), (4) Date: Jul. 12, 2001

(87) PCT Pub. No.: WO00/42822

PCT Pub. Date: Jan. 15, 1999

(30) Foreign Application Priority Data

Jan. 15, 1999 (SE) ............................................. 9900108

(51) Int. Cl.[7] ............................ A23L 3/365; H05B 6/00

(52) U.S. Cl. ......................... 426/241; 99/325; 219/703; 219/708; 426/524

(58) Field of Search ................................ 426/231, 241, 426/243, 524; 219/703, 708; 99/325

(56) References Cited

U.S. PATENT DOCUMENTS

| | | | | |
|---|---|---|---|---|
| 4,599,503 A | * | 7/1986 | Ueda | 99/325 |
| 4,874,914 A | * | 10/1989 | Eke | 99/325 |
| 6,198,084 B1 | * | 3/2001 | Kim | 426/241 |

* cited by examiner

*Primary Examiner*—George C. Yeung
(74) *Attorney, Agent, or Firm*—Stephen Krefman; Robert O. Rice; John F. Colligan

(57) ABSTRACT

A microwave oven and a method of processing frozen food in a microwave oven (1), which microwave oven comprises a microwave source (3), an oven cavity (2), and a control unit (5). The control unit is provided with an input signal containing information about the weight of the food, and causes the microwave source to feed microwaves at high average power into the oven cavity during a first time interval as well as a second time interval, which are separated by a waiting period, so that the foodstuff will be essentially thawed by the end of the second time interval.

33 Claims, 2 Drawing Sheets

THAWING METHOD IN MICROWAVE OVEN

BACKGROUND OF THE INVENTION

1. Field of the Invention

The present invention relates to methods of processing frozen food in a microwave oven and to a microwave oven therefor.

2. State of the Art

Traditionally, frozen food has been thawed by supplying heat from its outside. One problem associated with this technique is that it takes a long time since heat is supplied to the interior of the foodstuff by means of heat conduction only. A further problem is that when a surface layer of the food has thawed it acts as an insulating layer since thawed food has considerably lower heat conductivity than frozen food.

Microwave ovens are generally used for heating both thawed and frozen food. Microwave ovens heat the food by means of microwaves at a frequency of 2.45 GHz. Using a microwave oven for thawing food makes it possible to supply energy to the central parts of the frozen foodstuff since the microwaves propagate through the food even though they decay.

A problem associated with thawing food in microwave ovens is that the foodstuff may be heated unevenly so that some parts become extremely hot while other parts of the foodstuff remain frozen. This results in the thawed food being heated and burned.

U.S. Pat. No. 4,453,066 describes a method and a device for thawing frozen food in an oven cavity. The method is divided into several steps, the first of which involves feeding continuous microwave energy into the oven cavity, at a wattage of between 450 and 600 W, for a time period which depends on the weight of the foodstuff. The first step is followed by a second step during which no microwave energy is fed into the oven cavity. During the second step, the temperature in the foodstuff evens out. In a third step, microwave energy of considerably lower average power is fed into the oven cavity for a time period which depends on the weight of the foodstuff.

The PCT application PCT/JP98/00065 describes a method of thawing food in a microwave oven. The method is characterised in that the microwave energy is pulsed irregularly over time at least at the phase transition between ice and water. The average power of the microwaves is low in order to avoid overheating the food.

A problem associated with the prior art is that the thawing takes a fairly long time. For example, it takes more than 10 minutes to thaw 500 grams of minced meat by means of the method according to the above-mentioned U.S. patent. Users of microwave ovens have expressed the wish that thawing should be quick. Accordingly, there is a need for methods of thawing food in a microwave oven which are quicker than the present methods. At the same time, it is necessary to avoid hot areas in the foodstuff.

SUMMARY OF THE INVENTION

It is an object of the present invention to provide quick thawing of frozen food in a microwave oven, while avoiding overheating certain areas of the foodstuff.

This object is achieved by methods and a microwave oven exhibiting the features stated in the appended claims.

A method and a microwave oven according to the invention relate to processing of frozen foodstuffs preferably weighing more than 0.1–0.2 kg.

One basic idea of the invention is to feed as much microwave energy as possible into the food before the surface thaws.

A starting-point for the present invention was the insight that the frozen foodstuff is heated partly because of absorbed microwave energy and partly because the warmer ambient air heats the surface of the foodstuff.

A further basic idea of the invention is to supply a great deal of high power microwave energy during two time intervals so that a substantial part of the foodstuff will be thawed by the end of the second interval.

Surprisingly, it has been found possible and advantageous to supply a great deal of microwave energy over a short time, a considerable amount of energy thereby being absorbed inside the food before the surface layer has thawed.

The microwaves have a substantially shorter depth of penetration in thawed food in comparison with frozen food. Consequently, when the surface layer has thawed it absorbs a large part of the incoming microwave energy, resulting in the heating of the surface layer. Accordingly, it is important that the foodstuff be frozen when the thawing begins and particularly important that the surface layer of the foodstuff be frozen.

The inventors have come to realise that, using present microwave ovens with uniform field distribution, it is possible to feed a great deal of microwave energy into the foodstuff over a short time without overheating it locally.

Then invention enables considerably shorter thawing times, especially for food weighing up to a limit weight of 0.4–0.6 kg.

However, the invention enables a considerable time saving at other weights as well.

A microwave oven for thawing frozen food comprises a microwave source for generating microwaves, and oven cavity, and a control unit.

According to one aspect of the invention, a method for thawing frozen food, having a weight in a range from a lower weight, which is 0.1–0.2 kg, to the limit weight, comprises the steps of

- providing the control unit with an input signal containing information about the weight of the foodstuff and preferably also about its type;
- the control unit causing the microwave source to feed microwaves, having an average power of more than 400 W, preferably more than 600 W, and advantageously more than 800 W, into the oven cavity during a first time interval during which the total microwave energy supplied to the oven cavity exceeds 50 J per gram of food, preferably exceeds 80 J per gram of food, and advantageously exceeds 120 J per gram of food;
- the control unit causing the microwave source to be shut off during a waiting period subsequent to the first time interval;
- the control unit causing the microwave source to feed microwaves, having an average power of more than 400 W, preferably more than 600 W, and advantageously more than 800 W, into the oven cavity during a second time interval during which the total microwave energy supplied to the oven cavity exceeds 40 J per gram of food, preferably exceeds 60 J per gram of food and advantageously exceeds 90 J per gram of food.

It has been found disadvantageous from the point of view of thawing for the average power of the microwaves to be excessively high during the first and second time intervals.

According to a preferred embodiment, the average power of the microwaves during the first and the second time intervals is a maximum of 2 kW, preferably a maximum of 1.5 kW, and advantageously a maximum of 1.2 kW.

In the light of the invention, the person skilled in the art will appreciate that it is necessary to carry out experiments in order to optimise the method for a specific oven. Accordingly, in order to obtain an optimal thawing result, it may be necessary to adapt lengths of the first and the second intervals to the specific oven to be used.

Even when using an oven with a relatively uniform field distribution, it is advantageous to turn the foodstuff over subsequent to the first time interval in order to even out the effects of any lack of spatial uniformity of the microwave field. By turning the food over, it is possible immediately to begin a new time interval during which high average power is fed into the oven cavity from the microwave source.

Consequently, a method according to a preferred embodiment of the invention also comprises the steps of emitting a turning signal at the end of the first time interval; and the control unit detecting during the waiting period whether the foodstuff has been turned over.

According to a second aspect of the invention, it is advantageous to turn the food over subsequent to the first time interval when its weight is above the limit weight in order to make it possible to supply high power microwaves without overheating the foodstuff. Consequently, in connection with foodstuffs whose weight exceeds the limit weight a method according to the invention always comprises the steps of emitting a turning signal at the end of the first time interval;

the control unit detecting during the waiting period whether the foodstuff has been turned over. During the second time interval, high average power microwaves are fed into the oven cavity only if the control unit has received a signal indicating that the foodstuff has been turned over.

The signal to the oven indicating that the foodstuff has been turned over may, for example, be that the oven door closes, after previously having been opened. Alternatively, the microwave oven may be provided with a pressure sensitive means, a which is adapted to sense the weight of the foodstuff. When the food is being turned over, the pressure on the pressure sensitive means will change, thereby making it possible to detect that food has been turned over. It is also possible to use the pressure sensitive means for weighing the foodstuff.

If the weight of the foodstuff is below the limit weight and it is not turned over after the first time interval, it is advantageous for the second time interval to begin after a predetermined waiting period. The waiting period allows the temperature of the food to become uniform. Experiments have shown that the length of the waiting period should preferably be 1–3 minutes for foodstuffs having a weight below the limit weight. The optimal waiting period is slightly weight dependent and 2 minutes is a suitable choice for weights up to the limit weight.

In the case of food weighing more than the limit weight it is usually not possible to feed a sufficient amount of energy into the oven cavity during the first and second time intervals in order to essentially thaw the foodstuff without overheating it in certain places. In such a case, further steps are required in order to essentially thaw the food, in which steps microwave energy is supplied to the foodstuff at low power. It is possible to adapt the shape of the foodstuff in such a way that, even if its weight exceeds the limit weight, it will not bum in connection with thawing at high power.

The limit weight for most types of food is in the 0.4–0.6 kg range, and usually in the 0.45–0.55 kg range.

The lengths of the two time intervals are preferably determined from the relation $T_n=k0_n+k_n \cdot W$, W being the weight of the foodstuff and $k_n$ being a constant depending on inter alia the microwave power and the type of food. The constant $k0_n$ is determined experimentally for different ovens. The constant $k0_n$ is preferably zero but may differ from zero for certain ovens and certain types of food.

Preferred values of the microwave energy fed into the oven cavity during the first and the second time intervals for different types of food whose weight exceeds 0.1–0.2 kg and is below the limit weight are shown in Table 1. Particularly preferred energies are shown in parenthesis.

TABLE 1

| Type of Food | Energy/g (J) Interval 1 | Energy/g (J) Interval 2 |
|---|---|---|
| Animal | 110–160 (120–150) | 90–140 (100–120) |
| Vegetable | 140–170 (150–160) | 110–140 (120–130) |

Preferred values of the microwave energy fed into the oven cavity during the first and the second time intervals for different types of food whose weight exceeds the limit weight are shown in Table 2. Particularly preferred energies are shown in parenthesis.

TABLE 2

| Type of Food | Energy/g (J) Interval 1 | Energy/g (J) Interval 2 |
|---|---|---|
| Animal | 110–190 (120–180) | 40–80 (50–70) |
| Vegetable | 160–240 (180–220) | 50–90 (60–80) |

According to one aspect of the invention, a sufficient amount of energy is fed into the oven cavity to ensure thawing by the end of the second time interval of food having a weight up to the limit weight. In the case of animal and vegetable foods, this means that a total of more than 200 J/g and 250 J/g respectively are fed into the oven cavity during the first and second intervals.

According to a further aspect of the invention, the energy is supplied during the first and second time intervals with sufficient power to essentially thaw 0.1–0.6 kg of food in a time shorter than 1 minute per 100 grams of food, preferably in the time shorter than ⅔ of a minute per 100 grams of food.

For weights above the limit value, a greater part of the energy is fed into the oven cavity during the first time interval.

It has been found advantageous for the first time interval to be longer than the second one and for the total energy supplied to be greater during the first time interval than the second time interval. However, it is within the scope of the invention that the total energy supplied during the first time interval is somewhat smaller than the total energy supplied during the second time interval.

According to a further aspect of the invention, a method of processing frozen food in the oven cavity of a microwave oven by means of microwaves supplied to the oven cavity comprises the steps of feeding microwaves into the oven cavity at essentially continuous full power during a first time interval, interrupting the microwave feed during a waiting period subsequent to the first time interval, feeding microwaves into the oven cavity at essentially full continuous power during a second time interval subsequent to the waiting period, the duration of the second time interval being greater than ⅓, preferably greater than ½, of the duration of the first time interval, so that the food will be thawed at least to an essential degree by the end of the second time interval.

The energy supplied to the oven cavity during the first time interval advantageously constitutes 50–70% of the total energy in the first and the second time intervals, depending upon the weight of the food.

When the weight of the food is in a range from a lower weight, which is 0.1–0.2 kg, to a limit weight, which is 0.4–0.6 kg, the energy supplied during the second time interval is preferably at least about 70% and advantageously at least 80% of the energy supplied during the first time interval.

When the weight exceeds the limit weight and turning has been effected, the energy supply during the second time interval preferably constitutes at least about 40%, advantageously at least 50% of the energy supplied during the first time interval.

When the weight exceeds the limit weight, the second time interval is followed by a second waiting period, and during the time interval subsequent thereto microwaves are fed into the oven cavity at reduced average power for final thawing of the food. The energy supplied during the third time interval is less than about 25%, preferably less than 20% of the total energy supplied.

According to a further aspect of the invention, a microwave oven for thawing food comprises a microwave source for generating microwaves, an oven cavity, input means for an input signal containing information about the foodstuff, a control unit for controlling the microwave source, which control unit is connected to the input means. The control unit is adapted to calculate on the basis of the input signal the lengths of a first and a second time interval, when the weight of the foodstuff is in a range from a lower weight, which is 0.1–0.2 kg, to a limit weight, which is 0.4–0.6 kg, and to cause the microwave source to feed microwaves into the oven cavity during the first time interval at an average power of more than 400 W, preferably more than 600 W, and advantageously more than 800 W, and with a total amount of energy exceeding 50 J per gram of food, preferably exceeding 80 J per gram of food, and advantageously exceeding 120 J per gram of food. Moreover, the control unit is adapted to cause the microwave source subsequently to be shut off during a waiting period, and to cause the microwave source to feed microwaves into the oven cavity during the second time interval subsequent to the waiting period, at an average power of more than 400 W, preferably more than 600 W, and advantageously more than 800 W, and with a total amount of energy exceeding 40 J per gram of food, preferably exceeding 60 J per gram of food, and advantageously exceeding 90 J per gram of food.

According to the invention, the control unit is preferably adapted to cause the microwave source to feed microwave energy into the oven cavity during the first and the second time intervals only when the weight of the foodstuff is below the limit weight.

A uniform field distribution in the microwave oven can be ensured in many ways. According to one embodiment of the present invention, a uniform field distribution is ensured by the oven cavity having an upwardly decreasing horizontal cross-section in relation to its bottom cross-section.

According to one embodiment, this is ensured by one of the side walls sloping inwards at least at the top.

Its vertical lower part is preferably at least 50 mm high and a cavity wall opposite said sloping side wall is provided with at least one slot opening located at the top for feeding of microwaves.

In order further to improve field uniformity, the above features for ensuring uniform field distribution in the oven cavity can be combined with one or more of the following features:

- the ceiling of the oven cavity being provided with a slot opening for feeding of microwaves, the slot opening extending transversely of a vertical plane in which the horizontal cavity width is upwardly decreasing, and
- the horizontal cross-section of the cavity having a depth which is about 85–120% of the width.

A microwave with said features is described in the PCT application PCT/EP98/00553 which is herewith incorporated by reference.

Alternatively, according to the invention, a uniform field distribution in the oven cavity is ensured by providing the microwave oven with a waveguide device for feeding microwave energy from the microwave source to the oven cavity by the intermediary of at least two feed ports located at distance from each other. The waveguide device is dimensioned for providing a certain amount of internal reflection, a resonance state being achieved in the microwave oven for microwaves generated by the microwave source. The waveguide device has a predetermined quality factor which is higher than the quality factor of the oven cavity for any given current.

U.S. Pat. No. 5,237,139 describes in more detail an oven having said features ensuring a uniform field distribution in the oven cavity independently of the load in the oven cavity. Said U.S. patent is herewith incorporated by reference.

It is advantageous to combine the features of the above-mentioned patent specifications.

The input signal containing information about the weight of the foodstuff may, for example, consist of an inputting of the weight. In a simpler design, the input signal consists of a choice of one of several predetermined programs. The function of the input signal is to serve as a basis for an adjustment of the time interval.

The microwave energy is fed into the oven cavity in the form of pulses or preferably continuously.

It is advantageous for the food to rotate when microwaves are fed from the microwave source since this means that any lack of uniformity in the microwave field in the foodstuff will even out over time.

If the foodstuff is rotated it is advantageous for the microwave energy to be fed into the oven cavity continuously in order to avoid any lack of uniformity in the microwave field coacting with the periods without microwaves, thereby causing uneven heating.

Naturally, the various aspects described above can be combined in the same embodiment.

Exemplifying embodiments of the invention will be described below with a reference to the accompanying drawings.

DESCRIPTION OF THE PREFERRED EMBODIMENTS

Figure 1:
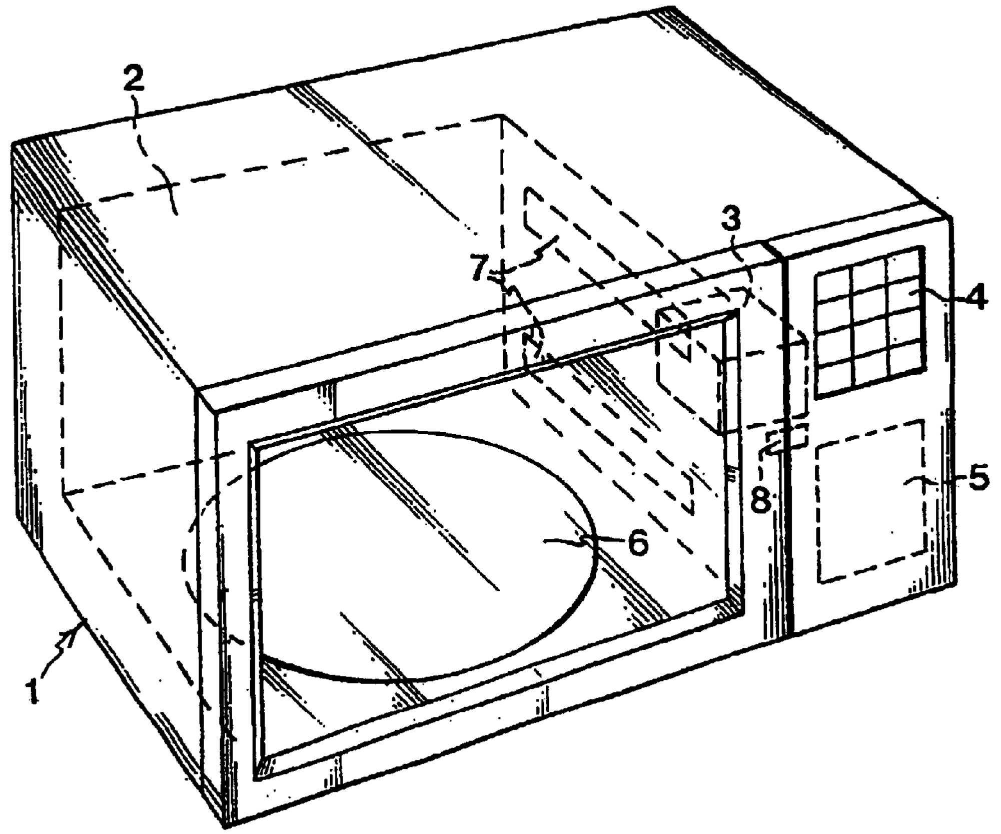
FIG. 1 shows a microwave oven according to an embodiment of the present invention.

FIG. 1 shows a microwave oven 1 according to a preferred embodiment of the present invention. The oven has an oven cavity 2, the microwave source 3 for generating microwaves at 2.45 GHz, an input means 4 for inputting the weight and type of the foodstuff, a control unit 5 for controlling the microwave source, and a load zone with a rotary plate 6 for the foodstuff as well as openings 7 for feeding the microwaves. The oven is also provided with a door contact 8 for checking whether the door is closed.

Figure 2:
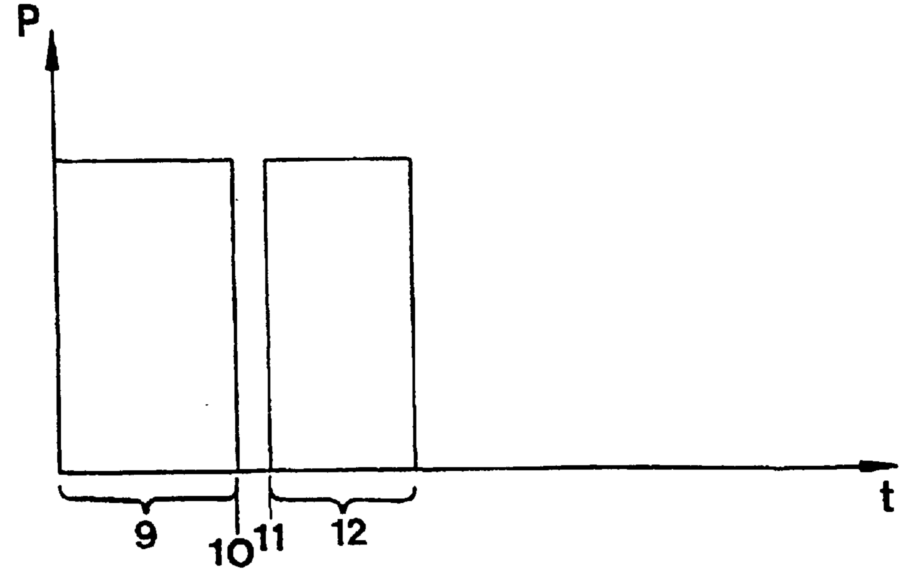
FIG. 2 is a chart showing microwave power as a function of time when thawing 500 grams of frozen minced meat according to a preferred embodiment of the present invention, wherein the food is turned over subsequent to the first time interval.

FIG. 2 shows microwave power P as a function of time t when thawing 500 grams of minced meat in the Talent model microwave oven from Whirlpool, which feeds a maximum of 1 kW of microwave power into the oven cavity, according to a preferred embodiment of the present invention. The oven is provided with a control program according to the invention. The temperature of the minced meat is −18° C. at the time 0 in the chart. The weight and the type of food are inputted to the input means 4 whichis connected to the control unit 5. The thawing is carried out in three steps. In the first step, full microwave power is fed from the microwave source during a first time interval 9. The control unit calculates the length of the time interval with the aid of the weight and type of the foodstuff. The first time interval is calculated using the formula $T_1=k0_1+k_1 \cdot W$, the constant $k0_1$ in this case being zero, $k_1$ being a constant which depends on the type of food and the power of the microwave oven, and W being the weight of the foodstuff. In the case of minced meat weighing 500 g a suitable value of the constant $k_1$ for the Talent oven is 0.13 s/g. Consequently, for 500 grams of minced meat, the first time interval is 65 seconds. This means that the microwave source has fed 0.13 kJ per gram of minced meat into the oven cavity. At the end of the first time interval 10, the control unit of the microwave oven emits a turning signal indicating that the food should be turned over. When the oven door closes at the time 11 the second time interval 12 begins, during which the microwave source feeds the oven cavity at full power. The length of the second time interval is calculated using the formula $T_2=k0_2+k_2 \cdot W$, the constant $k0_2$ in this case being zero, and $k_2$ being a constant which depends on the type of food and the power of the microwave oven. In the case of minced meat weighing a maximum of 500 g, experiments have shown that a suitable value of $k_2$ is 0.1 s/g for the Talent oven and, consequently, the second time interval is 55 seconds for 500 grams of minced meat. This means that the microwave source has fed 0.1 kJ per gram of minced meat into the oven cavity. If the food was turned over as soon as the signal was emitted, the entire thawing process will have taken just over 2 minutes. The food is then essentially thawed.

Figure 3:
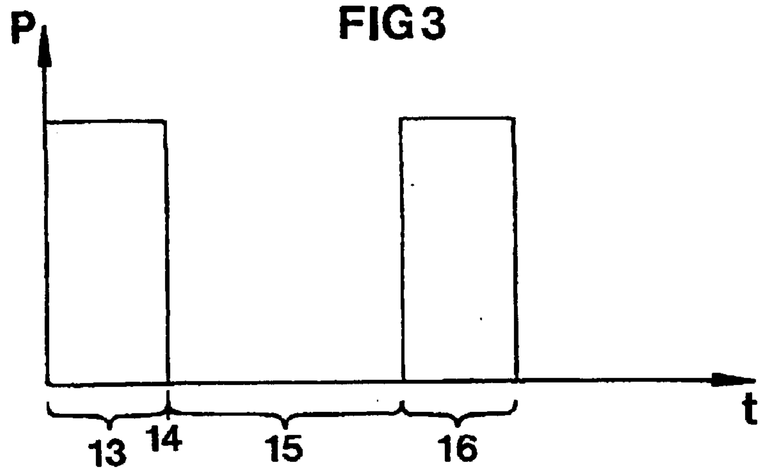
FIG. 3 is a chart showing microwave power as a function of time when thawing 500 grams of frozen minced meat according to an alternative embodiment of the present invention, wherein the food is not turned over subsequent to the first time interval.

FIG. 3 shows microwave power P as a function of time t when thawing 500 grams of minced meat according to an alternative embodiment of the present invention, wherein the foodstuff is not turned over subsequent to the first step. The weight and type of the foodstuff are inputted to the input means in the same way as in the previous example. The thawing is carried out in three steps. In the first step 13, full microwave power is fed from the microwave source during 65 s in accordance with the embodiment described above. After the first time interval, the microwave oven emits a turning signal at the time 14 indicating that the foodstuff should be turned. Subsequent to a predetermined 120 second waiting period 15, during which no microwaves are fed into the oven cavity, the microwave source begins feeding full power into the oven cavity during a second time interval 16. The waiting period allows the temperature of the food to become uniform. Consequently, subsequent to the waiting period, it is again possible to feed microwaves into the oven cavity at full power. The length of the second time interval is calculated using the formula $T_2=k0_2+k_2 \cdot W$, the constant $k0_2$ in this case being zero, $k_2$ being a constant which depends on the type of food and the power of the microwave oven. In the case of minced meat, a suitable value of $k_2$ is 0.1 and, consequently, the second time interval is 55 seconds for 500 grams of minced meat.

Experiments have shown that when thawing minced meat it is possible to use the same constants in the expressions of the lengths of the time intervals both when the minced meat is turned over and when it is not turned over subsequent to the first time interval.

However, the temperature only becomes sufficiently uniform if the weight of the food is below a maximum value. Experiments have shown that this maximum value is typically 500 grams for minced meat in the oven mentioned above. In the case of other foodstuffs, said maximum value is up to 0.6 kg. For weights exceeding said maximum value it is thus advantageous for the food to be turned over after the first time interval. This makes it possible to feed full power into the oven cavity during the second time interval without overheating the food.

Figure 4:
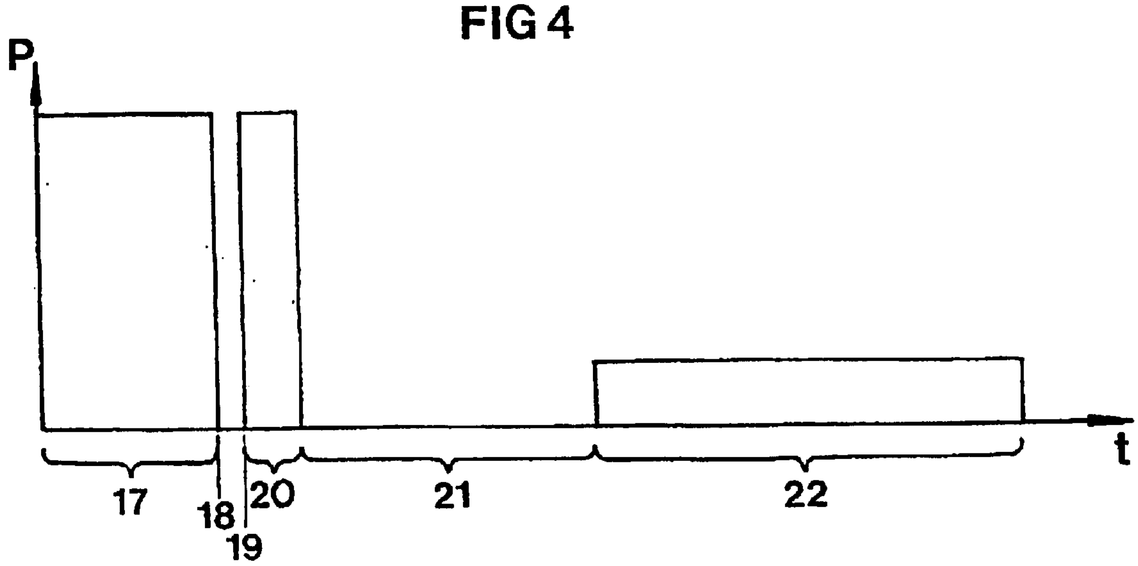
FIG. 4 is a chart showing microwave power as a function of time when thawing 1000 grams of frozen minced meat according to a preferred embodiment of the present invention, wherein the food is turned over subsequent to the first time interval.

FIG. 4 shows microwave power P as a function of time t thawing 1000 grams of minced meat, in a Talent oven from Whirlpool, according to a preferred embodiment of the present invention. The weight and type of the foodstuff are inputted to the input means which is connected to the control unit. The thawing is carried out in five steps. In the first step, full microwave power is supplied from the microwave source during a first time interval 17. The control unit calculates the length of the thawing time interval with the aid of the weight and type of the foodstuff. The first time interval is calculated using the formula $T_1=k0_1+k_1 \cdot W$, the constant $k0_1$ in this case being zero, $k_1$ being a constant which depends on the type of food and the power of the microwave oven, and W being the weight of the foodstuff. In the case of minced meat a suitable value of the constant $k_1$ is 0.16 s/g when the weight is 1000 g. Consequently, for 1000 grams of minced meat, the first time interval is 160 seconds. This is equivalent to the microwave source having supplied 0.16 kJ per gram of minced meat. After the first time interval, the microwave oven emits a turning signal at the time 18 indicating that the foodstuff should be turned over. When the oven door closes at the time 19 subsequent to the foodstuff being turned over, the second time interval 20 begins during which the microwave source feeds the oven cavity at full power. The length of the second time interval is calculated using the formula $T_2=k0_2+k_2 \cdot W$, the constant $k0_2$ in this case being zero, and $k_2$ being a constant which depends on the type of food and the power of the microwave oven. In the case of minced meat, a suitable value of $k_2$ is 0.05 s/g for 1000 grams of minced meat and, consequently, the second time interval is 50 seconds for 1000 grams of minced meat. This is equivalent to the microwave source having supplied 0.05 kJ per gram of minced meat.

After the second time interval, the meat is not completely thawed. Subsequent to the second time interval, the temperature of the meat is allowed to become uniform during a second waiting period 21. The length of the second waiting period is determined from the relation $T_v=k0_v=k_v \cdot W$, W being the weight of the foodstuff, $k0_v$ being a constant which is usually zero, and $k_v$ being a constant depending on inter alia the microwave power and the type of food. In the case of minced meat, 0.25 is a suitable value of $k_v$, which for 1000 g of minced meat results in a waiting period of 250 s. Subsequently, microwaves having an average power of 160 W are fed into the oven cavity during a third time interval 22 which is determined from the expression $T_3=k0_3=k_3 \cdot W$, the constant $k0_3$ being zero, W being the weight of the foodstuff in grams, and $k_3$ depending on the type of food and the average power from the microwave source. In FIG. 4, the power is constant during the third time interval but suitable average power can be achieved in the conventional way by pulsing the microwave source in a suitable manner. For 1000 grams of minced meat, 0.4 is a suitable value of $k_3$. The average power is determined experimentally for each oven so that the food will not burn. In the case of the Talent oven, experiments have shown that the average power should be below 400 W.

The values of the constants $k_n$ depend on the weight of the food, the power of the microwave source, and the type of food. The water content of the foodstuff is an essential parameter for $k_n$. With respect to the Talent oven, suitable values of $k_1$ are in the 0.11–0.17 s/g range for animal and vegetable foodstuffs, when the weight of the foodstuff is at least below 0.6 kg. This corresponds to feeding between 110 and 170 J per gram of food into the oven cavity. Experiments have shown that suitable values of $k_2$ for the Talent oven are in the 0.09–0.14 s/g range for animal and vegetable foodstuffs, when the weight of the foodstuff is at least below 0.6 kg. This corresponds to feeding between 90 and 140 J per gram of food into the oven cavity. The values indicated are guiding values only. The person skilled in the art will appreciate that the values of the constants should be determined experimentally for each type of oven and for each type of food.

Figure 5:
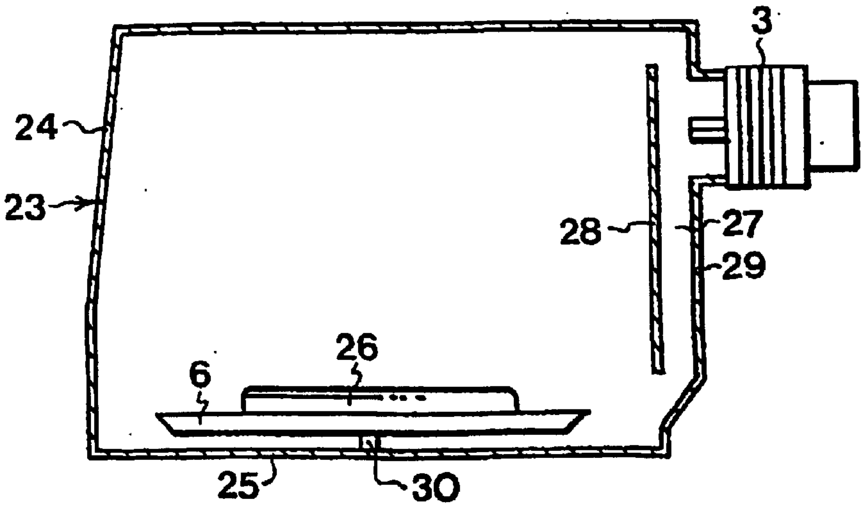
FIG. 5 schematically shows a vertical cross-section of a microwave oven according to a preferred embodiment of the present invention.

FIG. 5 schematically shows a cross-section of the oven in FIG. 1 according to a preferred embodiment of the present invention for providing a uniform electrical field distribution. The oven cavity is provided with a side wall 23, the upper part of which slopes inwards forming an angle of about 3° to vertical so that the horizontal cross-section of the oven cavity decreases vertically from the bottom 25 of the oven cavity. The cavity is essentially rectangularly parallelepipedal since the angle of the sloping wall is so small. The vertical part of the side wall is 50 mm high. The oven is provided with a rotary plate 6 for the food 26. The side opposite the sloping side wall is provided with two feeding slots located at a distance from each other. The microwave source 3 is adapted to feed microwaves into a waveguide device 27 which is integral with the oven cavity. The waveguide device is defined by the wall 28 and the outer wall 29 of the oven cavity. The waveguide is adapted to be resonant to microwaves at 2.45 GHz. The Figure also shows a weighing means 30 arranged between the rotary plate and the bottom of the oven cavity.

The skilled person will appreciate that there are many possible variants of the described embodiments within the scope of the invention.

What is claimed is:

1. A method of thawing frozen foodstuff in a microwave oven comprising a microwave source, an oven cavity, and a control unit, the weight of the foodstuff being in a range from a lower weight, which is 0.1–0.2 kg, to a limit weight, which is 0.4–0.6 kg, which method comprises the steps of providing the control unit with an input signal containing information about the weight of the foodstuff, for controlling the thawing;

the control unit causing the microwave source to feed microwaves having an average power of more than 400 W into the oven cavity during a first time interval during which the total microwave energy supplied to the oven cavity exceeds 50 J per gram of foodstuff;

the control unit causing the microwave source to be shut off during a waiting period subsequent to the first time interval; and the control unit causing the microwave source to feed microwaves, having an average power of more than 400 W into the oven cavity during a second time interval during which the total microwave energy supplied to the oven cavity exceeds 40 J per gram of foodstuff.

2. A method of processing frozen foodstuff in a microwave oven comprising a microwave source, an oven cavity, and a control unit, the weight of the foodstuff being in a range from a lower weight, which is 0.1–0.2 kg, to a limit weight, which is 0.4–0.6 kg, which method comprises the steps of providing the control unit with an input signal containing information about the weight of the foodstuff, for controlling the processing;

the control unit causing the microwave source to feed microwaves, having an average power of more than 400 W into the oven cavity during a first time interval;

the control unit causing the microwave source to be shut off during a waiting period, and the control unit causing the microwave source to feed microwaves having an average power of more than 400 W into the oven cavity during a second time interval, the total energy supplied during the first and the second time intervals and the lengths of the time intervals being chosen so that the foodstuff will be essentially thawed in less than 1 minute per 100 g of foodstuff.

3. A method of thawing frozen foodstuff in a microwave oven comprising a microwave source, an oven cavity, and a control unit, the weight of the foodstuff exceeding a limit weight in the range 0.4–0.6 kg, which method comprises the steps of providing the control unit with an input signal containing information about the weight of the foodstuff, for controlling the thawing;

the control, unit causing the microwave source to feed microwaves, having an average power of more than 400 W into the oven cavity during a first time interval during which the total microwave energy supplied to the oven cavity exceeds 50 J per gram of foodstuff;

the microwave oven emitting a turning signal at the end of the first time interval, indicating that the food stuff should be turned over;

the control unit causing, subsequent to the first time interval, the microwave source to be shut off during a waiting period, during which the control unit detects that the foodstuff has been turned over; and the control unit subsequently causing the microwave source to feed microwaves, having an average power of more than 400 W into the oven cavity during a second time interval during which the total microwave energy supplied to the oven cavity exceeds 40 J per gram of foodstuff.

4. A method according to claim 1, the additional steps of the microwave oven emitting a turning signal at the end of the first time interval, indicating that the foodstuff should be turned over; and the control unit detecting during the waiting period whether the foodstuff has been turned over, the microwave source feeding microwaves into the oven cavity during the second time interval depending upon whether the foodstuff has been turned over.

5. A method according to claim 3, wherein the second time interval begins at the time of the first of the following occurrences:

the time from the emission of the turning signal is longer than a predetermined waiting period, or the control unit receives a signal indicating that the foodstuff has been turned over.

6. A method according to claim 5, wherein the first time interval is longer than the second time interval.

7. A method according to claim 5, including feeding continuous microwave energy into the oven cavity during the first and the second time intervals.

8. A method according to claim 2, including the steps of providing the control unit with an input signal containing information about the type of foodstuff; and the control unit also controlling the length of the first and the second time intervals depending upon the type of foodstuff.

9. A method according to claim 8, wherein the foodstuff is rotated when microwave energy is fed from the microwave source.

10. A method according to claim 1, the foodstuff is animal; wherein that the total microwave energy supplied during the first time interval is 110–160 J/g of food; and the total microwave energy supplied during the second time interval is 90–130 J/g of food.

11. A method according to claim 3, wherein the foodstuff is animal;

that the total microwave energy supplied during the first time interval is 110–190 J/g of foodstuff; and the total microwave energy supplied during the second time interval is 40–80 J/g of foodstuff.

12. A method according to claim 1, wherein the foodstuff is vegetable;

that the total microwave energy supplied during the first time interval is 140–170 J/g of foodstuff; and that the total microwave energy supplied during the second time interval is 110–140 J/g of foodstuff.

13. A method according to claim 3, wherein the foodstuff is vegetable;

that the total microwave energy supplied during the first time interval is 160–240 J/g of foodstuff; and that the total microwave energy supplied during the second time interval is 50–90 J/g of foodstuff.

14. A microwave oven for thawing foodstuff which microwave oven comprises a microwave source for generating microwaves, an oven cavity, input means for an input signal containing information about the foodstuff;

a control unit for controlling the microwave source, which control unit is connected to the input means and a control unit is adapted to calculate the lengths of a first and a second time interval on the basis of the input signal;

to cause the microwave source to feed microwaves into the oven cavity during the first time interval at an average power of more than 400 W and with a total energy which exceeds 50 J per gram of food;

to cause the microwave source to be shut off during a waiting period; and to cause the microwave source to feed microwaves into the oven cavity during the second time interval at an average power of more than 400 W and with a total energy which exceeds 40 J per gram of foodstuff.

15. A microwave oven according to claim 14, wherein the microwave oven is adapted to emit a turning signal at the end of the first time interval, containing information indicating that the foodstuff should be turned over; and to detect whether the foodstuff has been turned over during the waiting period.

16. A microwave oven according to claim 14, wherein said input means is provided with one entry for the weight of the foodstuff and one entry for the type of food.

17. A microwave oven according to claim 14, wherein the microwave oven includes a rotary plate for rotating the foodstuff in the load zone.

18. A microwave oven according to claim 14, wherein the control unit is adapted to cause the microwave source to feed microwave energy into the oven cavity during the first and the second time intervals only when the weight of the foodstuff is in a range from a lower weight, which is 0.1–0.2 kg, to a limit weight, which is 0.4–0.6 kg.

19. A microwave oven according to claim 14, wherein the control unit is adapted to cause the microwave source to feed microwaves into the oven cavity during a third time interval subsequent to a second waiting period when the weight of the foodstuff exceeds a limit weight in the range 0.4–0.6 kg.

20. A microwave oven according to claim 18, wherein when the weight of the foodstuff is in a range from a lower weight, which is 0.1–0.2 kg, to a limit weight, which is 0.4–0.6 kg, the microwave oven is adapted to emit a sufficient amount of microwave energy to essentially thaw the foodstuff in less than 1 minute per 100 g of food from the beginning of the first time interval.

21. A microwave oven according to claim 20, wherein the oven cavity has an upwardly decreasing horizontal cross-section in relation to its bottom cross-section at least in the upper part of the cavity, so that a uniform distribution of the electric field in the cavity is obtained.

22. A microwave oven according to claim 21, wherein the oven cavity has a side wall which slopes inward at least at the top.

23. A microwave oven according to claim 22, wherein the microwave oven is provided with a waveguide device for feeding microwave energy from the microwave source to the oven cavity through at least two feed openings located at a distance from each other, which waveguide device is dimensioned for providing a certain amount of internal reflection, a resonance state being achieved in the waveguide device for microwaves generated by the microwave source, the waveguide device having a predetermined quality factor which is higher than a quality factor of the oven cavity for any given current.

24. A method of processing frozen foodstuff in the oven cavity of a microwave oven by means of microwaves supplied to the oven cavity, which method comprises the steps of feeding microwaves into the oven cavity at essentially full continuous power during a first time interval;

interrupting the feeding of microwaves during a waiting period, subsequent to the first time interval;

feeding microwaves into the oven cavity at essentially full continuous power during a second time interval, subsequent to the waiting period, the duration of the second time interval being greater than ⅓, of the duration of the first time interval, so that the foodstuff will be thawed at least to an essential degree by the end of the second time interval.

25. A method according to claim 24, including the additional steps of emitting a turning signal at the end of the first time interval, indicating that the foodstuff should be turned over; and detecting that foodstuff has been turned over and shortening the waiting period by immediately beginning the second time interval.

26. A method according to claim 24, wherein the weight of the foodstuff is in a range from a lower weight, which is 0.1–0.2 kg, to the limit weight, which is 0.4–0.6 kg; and that the energy supplied during the second time interval is at least about 70% of the energy supplied during the first time interval.

27. A method according to claim 26, wherein the total duration of the first time interval, the waiting period, and the second time interval is less than about 1 minute per 0.1 kg of food.

28. A method according to any one of claim 27, wherein the microwave power supplied to the oven cavity is at least 400 W;

that the total microwave energy supplied to the oven cavity during the first time interval exceeds 50 J per gram of foodstuff; and that the total microwave energy supplied to the oven cavity during the first time interval exceeds 40 J per gram of foodstuff.

29. A method according to claim 25, wherein the weight of the foodstuff is greater than a limit weight which is 0.4–0.6 kg;

that the energy supplied during the second time interval is at least about 40% of the energy supplied during the first time interval;

that the second time interval is followed by a second waiting period; and that, during a third time interval subsequent thereto, microwaves are fed into the oven cavity at reduced average power for final thawing of the foodstuff.

30. A method according to claim 29, wherein the energy supplied during the third time interval is less than about 25%, of the total energy supplied.

31. A method according to claim 30, wherein the average power of the microwaves supplied to the oven cavity during the third time interval is at least lower than 400 W.

32. A method according to any one of claim 31, wherein that the microwave power supplied to the oven cavity during the first and the second time intervals is at least 400 W;

that the total microwave energy supplied to the oven cavity during the first time interval exceeds 50 J per gram of foodstuff, and that the total microwave energy supplied to the oven cavity during the first time interval exceeds 40 J per gram of foodstuff.

33. A method according to claim 29, wherein the waiting time of the second waiting period depends on the weight of the foodstuff.

* * * * *